(12) United States Patent
Hathaway et al.

(10) Patent No.: US 11,902,262 B2
(45) Date of Patent: *Feb. 13, 2024

(54) SYSTEM AND METHOD FOR ENCRYPTION, STORAGE AND TRANSMISSION OF DIGITAL INFORMATION

(71) Applicant: Virtual Connect Technologies, Inc., Greenville, SC (US)

(72) Inventors: Benjamin Hathaway, Simpsonville, SC (US); David Setzer, Greenville, SC (US)

(73) Assignee: Virtual Connect Technologies, Inc., Greenville, SC (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/835,788

(22) Filed: Jun. 8, 2022

(65) Prior Publication Data

US 2022/0337568 A1 Oct. 20, 2022

Related U.S. Application Data

(63) Continuation of application No. 17/507,330, filed on Oct. 21, 2021, now abandoned, which is a continuation of application No. 17/112,945, filed on Dec. 4, 2020, now Pat. No. 11,184,337, which is a continuation-in-part of application No. 16/886,921, filed on May 29, 2020, now Pat. No. 11,456,998, which is a continuation of application No. 16/001,740, filed on Jun. 6, 2018, now Pat. No. 10,708,244.

(60) Provisional application No. 63/069,398, filed on Aug. 24, 2020, provisional application No. 62/516,611, filed on Jun. 7, 2017.

(51) Int. Cl.
H04L 29/06 (2006.01)
H04L 9/40 (2022.01)
H04L 67/02 (2022.01)
H04L 51/18 (2022.01)
H04L 9/08 (2006.01)

(52) U.S. Cl.
CPC ........ H04L 63/0442 (2013.01); H04L 9/0825 (2013.01); H04L 51/18 (2013.01); H04L 63/061 (2013.01); H04L 67/02 (2013.01)

(58) Field of Classification Search
CPC ... H04L 63/0442; H04L 51/18; H04L 63/061; H04L 67/02
See application file for complete search history.

(56) References Cited

U.S. PATENT DOCUMENTS

2004/0249817 A1* 12/2004 Liu ..................... H04L 63/0435
707/999.009

* cited by examiner

*Primary Examiner* — Tri M Tran
(74) *Attorney, Agent, or Firm* — Kim and Lahey Law Firm, LLC; Douglas W. Kim

(57) ABSTRACT

A computerized system for encryption and transmission of digital information comprising: a set of non-transitory computer readable instructions that, when executed by a processor, preform the steps of: receiving a data set from an instance of a sender browser running on a sender computer device, verifying that a recipient is a subscriber and if the recipient is a subscriber, generating a sender key, encrypting a portion of the data set with the sender key, generating a key pair having a first key and a second key, encrypting the sender key with the first key, encrypting the second key with a master key, and, generating a hyperlink to the portion of the data set that is encrypted.

24 Claims, 7 Drawing Sheets

SYSTEM AND METHOD FOR ENCRYPTION, STORAGE AND TRANSMISSION OF DIGITAL INFORMATION

REFERENCE TO RELATED APPLICATIONS

This application is a continuation of U.S. application Ser. No. 17/507,330 filed Oct. 21, 2021 which is a continuation of U.S. application Ser. No. 17/112,945 filed on Dec. 4, 2020 which is a continuation in part of U.S. application Ser. No. 16/886,921 filed on May 29, 2020 which is a continuation of U.S. application Ser. No. 16/001,740 filed Jun. 6, 2018 (now U.S. Pat. No. 10,708,244) which claims priority on US Patent Provisional Patent Application 62/516,611 filed Jun. 7, 2017, and U.S. Provisional Patent application 63/069,398 filed Aug. 24, 2020, each of which are incorporated by reference.

BACKGROUND OF THE INVENTION

1) Field of the Invention

The invention is directed to an improved secure encryption system providing for a sender to send an encrypted message without the need for a client application.

2) Description of Related Art

There is an increased need for encrypted communications given the rise in data breaches. For example, it has been reported that had an encrypted email been used, the breaches of SONY, State Department networks, Stratfor and Penn State Hospital may have been prevented. However, the majority of digital information is transmitted unencrypted. While there are many reasons that email encryption is not as widely deployed, some of the more common include complexity, compatibility, degraded computer performance, recipient requirements and the like. As for compatibility issues, if the encryption system uses S/MIME it may not be compatible with PGP. Further, other systems do not allow you to use your current email client but require a proprietary email client to send and receive messages. This and other disadvantages and complexities have prevented encrypted email from being widely deployed.

Further, most encryption solutions rely on downloading and installing one or more applications (apps) and/or plugins. This complexity is a substantive barrier to most users and generates more support tickets than should be needed. Further, digital information can be kept for extended periods of time, even when the purpose of the message has long since passed. Keeping messages for long periods of time increases the risk that security will be breached. The complexity of creating an account, downloading and installing an app or plug-in, logging into the downloaded software and learning how to use the software have depressed widespread deployment of encrypted email systems.

Further, passwords and keys must be managed which can lead to unrecoverable digital information if the keys and passwords are lost as well as increased administration efforts. For example, U.S. Pat. No. 7,174,368 is directed to a system, method, and computer program product for providing an encrypted email reader and responder. This disclosure stated that it can include: obtaining by a first user, a license for an email client software application program having public/private encryption; requesting by the first user that a second user download a reader/responder software application program in order to exchange encrypted emails between the first user and the second user; downloading and installing the reader/responder software application program by the second user; sending an email by the second user to the first user including embedding an unencrypted public key by using a send key function of the reader/responder software application program; receiving the email from the second user by the first user, wherein the unencrypted public key is embedded in the email; responding by the first user by sending a second email to the first user, where the reader/responder software application program encrypts a message of the second email into an encrypted message using the unencrypted public key of the second user; receiving the second email by the second user with the encrypted message as an attachment from the first user into a third party email software application program, wherein the third party email software application program is different from the reader/responder software application program and the email client software application program; and opening by the second user the attachment to execute the reader/responder software application program operative to allow a user without the email client software to read and respond to encrypted emails created and sent from a user having the email client software. Such a process presents multiple points of user error and unnecessary complex administrative requirements.

Attempts have been made for reducing complexity to the user such as a biometric system as disclosed in United States Patent Application Publication 20030140235. This disclosure is a method for permitting the secure transmission of electronic messages by using biometric certification. Enrolled fingerprint feature sets, which have been uniquely modified for a particular person with whom messages will be exchanged, are cross-enrolled between the sender and receiver such that the biometric identity of both the sender and receiver can be checked during message sending and receiving. In one embodiment, the sender provides a live-scan fingerprint feature set which is subtracted from the enrolled fingerprint feature set of the sender to create a "difference key" that is used to encrypt the message and other fingerprint data. The receiver decrypts the sender's live-scan fingerprint feature set that is then used to reconstruct the difference key, which is then used to decrypt the message. Obviously, this requires a fingerprint scanner.

United States Patent Application Publication 2006/0021066 also relies upon a downloaded software application. This disclosure is directed to an encryption system that includes memory for storing a data file and a decryption application. The decryption application is configured to authenticate a user and to receive a data packet.

The data packet has a data message encrypted via an encrypted encryption key that is embedded within the data packet. The decryption application is configured to decrypt the data message based on the embedded encryption key and to interface the decrypted data message with the user if the user is authenticated by the decryption application. The decryption application is configured to recover the encryption key and to decrypt the data message based on data within the data packet and based on data within the data file, and the decryption application controls access to the data within the data file based on whether the user is authenticated by the decryption application.

Typically, end to end encryption systems for sending and receiving messages requires that the sender and the recipient have a pair of cryptographic keys. The sender encrypts the message locally on his device using the recipient's public key. The receiver decrypts it on his device using his private key. An example of one implementation of end to end encryption is shown in U.S. Pat. No. 4,578,530. In end-toend encryption, encryption and decryption occur and the users' devices (e.g. the sender and the recipient's devices). Therefore, the sender and the recipient have to have functional encryption software on each of their devices. This requirement, coupled with the need to generate and manage key pairs, multiple email client providers, fragmented user bases, lack of interoperability, and other facts have led to a low adoption rate.

The need for a more secure communications and information exchange system needed as cloud computing gains in popularity. Generally, cloud computing described the functionality of an on-demand availability of information system resources including data storage cloud storage, computing power and software functionality, without direct active management by the user. Therefore, the client side (sender and receiver) typically use a browser or user-specific application that accesses a cloud infrastructure, such as a cloud server, and does not require software to be installed, run or maintained on the client side. A cloud server can be a web server and is generally hardware or software that receives requests and processes these requests from a client. A client, commonly a web browser or web crawler, initiates communication with a cloud server typically by making a request for a specific resource using HTTP or HTTPS and the server responds with the content of that resource or an error message if unable to do so.

A distinctive disadvantage with cloud computing is that the information that passes between the client and the cloud service is unsecured. If HTTP is used, the request that is transmitted from the client to the cloud server in plaintext that anyone monitoring the connection can read. HTTP is especially an issue when clients submit sensitive data to a cloud server such as a password, a credit card number, or any other data entered into a website form. When using HTTP all this data is sent in readable plaintext. There has been some attempt to reduce the risk with HTTP by the creation of HTTPS. HTTPS is a communications protocol that uses Transport Layer Security (TLS) (formerly Secure Sockets Layer) and provides additional security by authentication of the accessed website, protection of the privacy and integrity of the exchanged data while in transit, protects against man-in-the-middle attacks, provides bidirectional encryption of communications between a client and server that can protect the exchanged data against eavesdropping and tampering. In practice, HTTPS can provide a reasonable assurance that exchanged data between the client and the cloud server is protected from unauthorized access and attacks. However, HTTP and HTTPS play no part in the security of the exchanged data once the data is received by the cloud server, nor with the disposition of the exchanged data thereafter.

Therefore, it is an object of the present system to provide for a system that provides for a more secure end-to-end encryption of communications, including email and attachments, in the cloud computer environment without the need for specialized client-side encryption software.

A system that is easy to use, does not require propriety hardware, can be used with any platform or email client and provides secure transmission as needed.

Accordingly, an objective of the present invention is to provide an encryption system allowing the user to continue to use the existing email client without needing to download any apps or plug-ins and without needing passwords.

SUMMARY OF THE INVENTION

The present invention directed to a computerized system for encryption and transmission of digital information comprising: an encryption server in communications with a sender computer device and a recipient computer device; and, a set of encryption server computer readable instructions included on the encryption server that, when executed by a processor, perform the steps of: receiving an original information set from the sender computer device, generating a sender symmetrical key, encrypting a portion of the original information set with the sender symmetrical key, receiving a personal data key from the sender computer device, generating an asymmetric key pair having a public and private key pair, encrypting the sender symmetrical key with the public key of the asymmetrical key pair and the personal data key, encrypting the private key of the asymmetrical key pair with a master key, generating a hyperlink to the encrypted portion of the original information set, transmitting the hyperlink to the recipient computer device wherein the hyperlink includes security properties taken from the group consisting of an expiration time for the hyperlink, an expiration time for the original information set, device dependent information, geolocation dependent information, biometric information, or any combination thereof, receiving a reply from the recipient computer device, generating a recipient symmetrical key, encrypting the reply with the recipient symmetric key, encrypting the recipient symmetrical key with the private key of the asymmetrical key pair, creating a reply hyperlink to include a link to the encrypted reply, and transmitting the reply hyperlink to the sender computer device.

The computerized system can include a gateway server in communications with the encryption server; and, a set of gateway computer readable instructions on the gateway server that, when executed by a processor, perform the steps of: receiving the original information set, and determining if the original information set includes trigger information and if so, encrypting a portion of the original information set with the sender symmetrical key. The data set can be created using a computer device can include a text message client, email client, digital scanner, digitizing copier, digital image capture device or any combination thereof. The recipient computer device can include an email client in communications with an email server for receiving the sender hyperlink and providing the sender hyperlink in an email message to a recipient. The recipient computer device can include a text message client in communications with a text message server for receiving the sender hyperlink and providing the sender hyperlink in a text message to a recipient.

The computerized system can include a sender thread initiated by the creation of the original information set; a recipient thread initialed by the creation of a reply to the original information set; and, the set of encryption server computer readable instructions includes instructions for encrypting the sender thread with the sender symmetrical key and encrypting the recipient thread with the recipient symmetrical key.

Each user, sender, and receiver can have a separate message thread that can be encrypted with the user's symmetrical key. Therefore, an individual message can be copied and encrypted for each user on the thread. For the n number of users, senders and receivers, there can be at least n user symmetric encryption keys and n threads.

The encryption computer readable instructions can include instructions for periodically generating a subsequent asymmetric key pair having a public and private key pair; encrypting the sender symmetrical key with the public key of the subsequently generated asymmetrical key pair and encrypting the private key of the subsequently generated asymmetrical key pair with the master key. The sender computer device can include an email client and the encryption computer readable instructions can include instructions for decrypting all information in the original information set received from the sender computer device, decrypting all the original information set using the private key of the asymmetrical key pair and the symmetrical key and transmitting the decrypted original information set to an email server in communication with the email client.

The encryption computer readable instructions can include instructions for providing an interface to a user for direct creation of the original information set. The original information set can include an email message and the encryption computer readable instructions can include instructions for determining if a subject line included in the email message includes a left and right bracket and if so, encrypting the portion of the original information set with the sender symmetrical key.

The encryption computer readable instructions can include instructions for encrypting a first portion of the original information set with a first sender symmetrical key and encrypting a second portion of the original information set with a second sender symmetrical key. The first portion can be a text of an email message and the second portion can be an attachment associated with the text of the email message. The second portion can be a second portion of text of the email message.

The computerized system for encryption and transmission of digital information comprising can include a set of non-transitory computer readable instructions that, when executed by a processor, preform the steps of: receiving a data set from an instance of a sender browser running on a sender computer device, verifying that a recipient is a subscriber and if the recipient is a subscriber, generating a sender key, encrypting a portion of the data set with the sender key, generating a key pair having a first key and a second key, encrypting the sender key with the first key, encrypting the second key with a master key, and, generating a hyperlink to the portion of the data set that is encrypted.

The hyperlink can include security properties taken from the group consisting of an expiration time for the hyperlink, an expiration time for the data set, recipient device dependent information, and geolocation dependent information, biometric information, or any combination thereof. The first key can be a public key. The second key can be a private key. The set of non-transitory computer readable instructions can be stored on the computer readable medium. The encryption server can be in communications with the sender computer device. The set of non-transitory computer readable instructions can include instructions for transmitting a notification to the recipient that an encrypted message has been sent to the recipient.

The set of non-transitory computer readable instructions can include instructions for receiving a reply from a recipient computer device, generating a recipient key, encrypting the reply with the recipient key, encrypting the recipient key with the first key, and creating a reply hyperlink to the reply that has been encrypted. The set of non-transitory gateway instructions for receiving the data set and determining if the data set includes trigger information and if so, encrypting a portion of the data set with the sender key. The trigger information can be an alpha numeric symbol placed before, after, or before and after the data set and can include bracket placed in a subject line of the data set where the bracket can be an open bracket, closed bracket or include both open and closed bracket.

The recipient computer device can include an email client in communications with an email server for receiving the hyperlink and a text message client configured to receive the hyperlink. The set of non-transitory computer readable instructions include instructions for periodically generating a key pair having a public key and a private key; encrypting the sender key with the public key and encrypting the private key with a master key. The sender key can be a first sender key, and the set of non-transitory computer readable instructions include instructions for encrypting a second portion of the data set with a second sender key. The first portion of the data set can be the text of a message and the second portion of the data set can be an attachment associated with the text. The text can be an email message.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION

Figure 1:
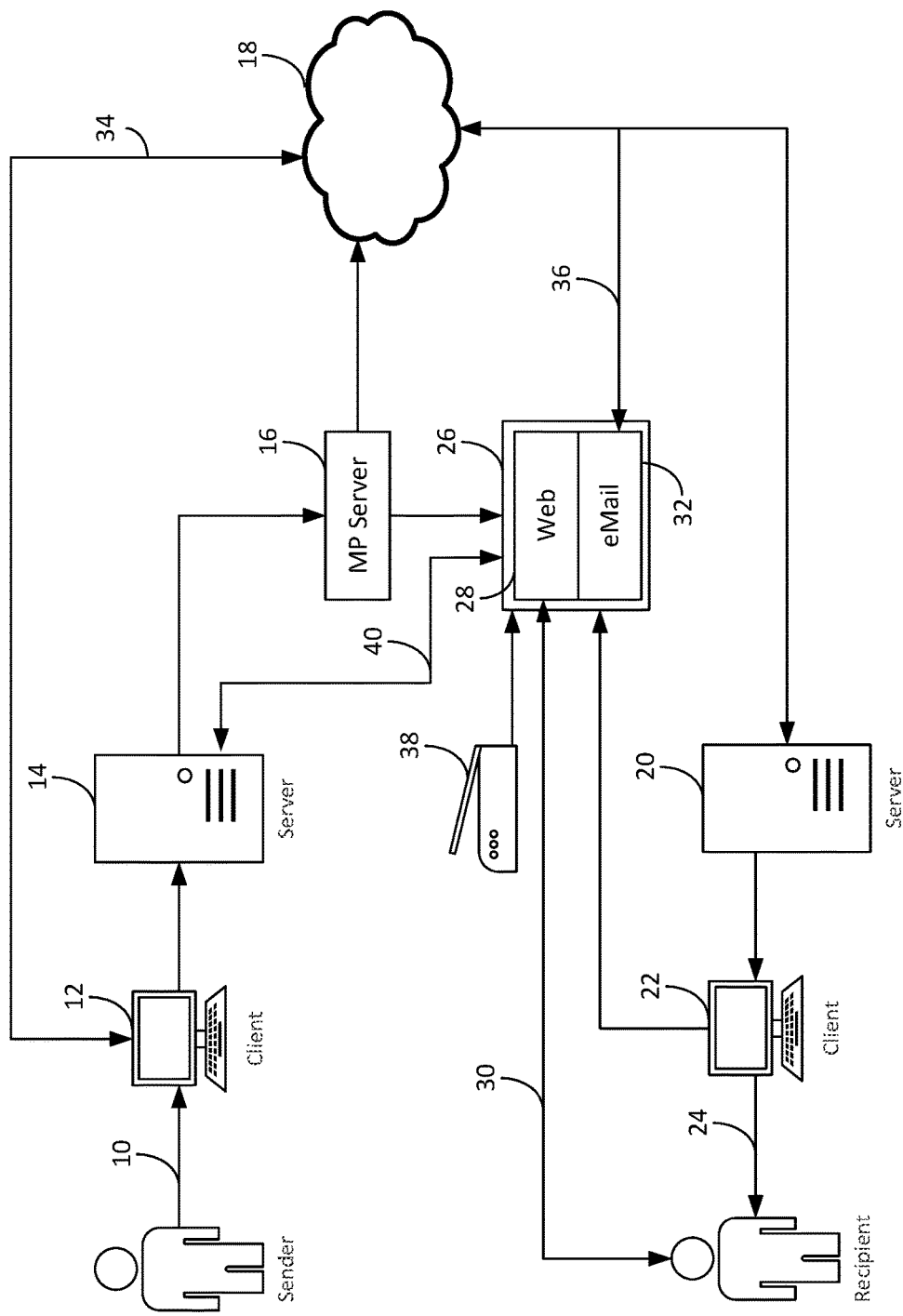
FIG. 1 is a diagram of aspects of the invention.

Computer readable instructions, when executed by a computer processor, cause the computer to perform a series of steps to accomplish a specific task and results in useful, concrete, and tangible results. These computer readable instructions can be tied to a particular machine or apparatus with the specific purpose of executing the computer readable code for accomplishing tangible results and represents and accomplishes the manipulation of physical data. The computer readable instructions can be stored on an encryption server. The computer readable instructions can be non-transitory, for example, stored on a computer readable medium.

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result when executed by a computer and its processor representing or resulting in the tangible manipulation of physical objects. These steps also require physical manipulations of physical quantities such as electrical or magnetic physical elements and are capable of being stored, transferred, combined, compared, or otherwise manipulated readable medium that is designed to perform a specific task or tasks. Actual computer or executable codes or computer readable codes may not be contained within one file or one storage medium but may span several computers or storage mediums. The term "host" and "server" may be hardware, software, or a combination of hardware and software that provides the functionality described herein.

The present invention is described below with reference to flowchart illustrations of methods, apparatus ("systems") and computer program products according to the invention.

It will be understood that each block of a flowchart illustration can be implemented by a set of computer readable instructions or code.

Elements of the flowchart support combinations of means for performing the special functions, combinations of steps for performing the specified functions and program instruction means for performing the specified functions. It will be understood that each block of the flowchart illustrations can be implemented by special purpose hardware-based computer systems that perform the specified functions, steps, or combinations of special purpose hardware or computer instructions.

The invention herein is necessarily rooted in computer technology in order to overcome a problem specifically arising in the realm of computer communications and digital transmissions. This invention is not merely the routine or conventional use of a computer or software, but an improvement over the existing technology operation of computer systems. The problem solved by this invention is a problem unique to digital information and email encryption, storage, and transmission.

The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

Referring to FIG. 1 a data set is created at 10 such as an email message using an existing email client 12. The data set can include text, attachments, or other data. The data set can be created by a sender using a web browser and is not limited to the user having a client or other software running or installed on the sender computer device. The data set can be generated by any number of known clients such as email clients, text message clients, productivity applications, and does not have to be proprietary to this invention. The non-transitory computer readable instructions can be included in a third-party application such as Gmail, Microsoft 365, Yahoo! Mail, Microsoft Outlook, and the like. In the subject line, the text of the subject line can include a designation indicating that the sender wishes that the email be encrypted. For example, the text of the subject line can be "bracketed" by placing indicators, such as brackets in with the subject line. This indicator can be any indicator that can be deciphered by the computer readable instructions and indicate that the email is to be encrypted. In one embodiment, the indicators are square brackets placed to the left and right of the subject line (e.g. [Subject Line]).

Once sent, the data set can be transmitted to the sender's content server or cloud application 14. The content server (e.g. mail server, message server and the like) or cloud application can recognize the sender or recipient as a licensed user or subscriber and can redirect the message to a gateway server 16. If the sender does not request that the data set be encrypted, the data set can be sent through a wide area network 18 to the recipient's server 20. The data set is provided to the recipient's email client 22 and accessed by the recipient at 24.

The communications between the client 12 and the server 14 can be a secured socket layer (SSL) or transport layer security (TLS). The communications between the server 14 and the gateway server 16 for unencrypted email can be through TLS. Communications between the gateway server 16 through the wide area network to the recipient's server 20 can be simple mail transport protocol (SMTP). The communication between the recipient's server and the recipient's client can be SSL or TLS.

In the event that the sender wishes for the data set transmitted at 10 to be encrypted, the sender can indicate that the data set is to be encrypted. In this case, the gateway server 16 determines that the data set (e.g., email, message, attachment, and the like) is to be encrypted and passes the data set to an encryption server 26. The data set can be sent with TLS. The encryption server then creates a notification link that can be transmitted through computer readable instructions that include a hyperlink to a location on a server, include a link in a text message or other electronic messaging that can be provided to a recipient. This notification link can be transmitted as an email message to the email server 20 to the recipient. The client of the recipient can be used to retrieve the notification link. The notification link can point to the web portion 28 of the encryption server where the recipient's browser can communications between the recipient and the encryption server at 30. The browser can communicate using hypertext transfer protocol secure (HTTPS) and can use SSL or TLS. The encryption server can authenticate the sender and recipient with physical location/geolocation, unique identifier or the like so that passwords are not needed for subsequent access. The recipient accesses the link and views the encrypted data set through secure connection 30. The recipient can view the data set and can then reply to the data set. The original sender can be notified that the recipient replied and then view the reply in the secure link on the web portion of the encryption server. In one embodiment, the recipient does not need to be a licensed user or subscriber to view the initial message, reply, or participate in the encrypted communication. In one embodiment, the sender does not need to be a licensed user or subscriber to view the initial message, reply, or participate in the encrypted communication. A user can also initiate an encrypted message by accessing the web portion 32 of the encryption server directly at 34 and 36 through the sender's browser using secure connection to the encryption server. The gateway server and the encryption server can be logical servers, located on the same physical server, distributed over multiple servers or on physically distinct servers be cloud based and any combination thereof.

When the sender creates the data set at 10, the sender can designate security properties to the message. These security properties can be transmitted to the encryption server so that the link sent to the recipient can include these security properties. The security properties can include an expiration time for the link so that the link is only active for a predetermined period of time. Further, the underlying data can be set to automatic deletion after a predetermined period of time. The security properties can include a device dependent property so that the identification of the initial device used to initially open the link will be associated with the link so that the link can then only be subsequent access from that device. The security properties can include a geolocation information associated with the recipient or the link. In one embodiment, the sender can determine the physical location allowable for accessing the link. For example, the link may only be accessible from the device within a certain geographic location, such as a country, state, or other physical location. In one embodiment, the physical location of the device used to initial access the link is associated with the link and subsequent access to the link will only be allowed from the same geolocation where the device is located when the link is initially accessed. Subsequent attempts to access the link from a different location can be prohibited.

In one embodiment, geolocation tracking and device fingerprint technology can be used to eliminate the need for traditional passwords. When the recipient receives and clicks in the link, the link is associated with a unique identifier of the recipient computing device (e.g. MAC, NIC, IP address), the geographic location of the user or other designating information so that if subsequent access of the link is attempted that does not match the identifier, access to the link is not allowed. For example, the physical location (e.g. GPS coordinates) of the recipient's device can be detected and transmitted to the server when the link is initially accessed. The server can then associate the physical location with the link. If the subsequent access of from a device that does not match the physical location of the initial access, the subsequent access can be prevented. The unique identifier of the recipient's device can be detected and transmitted to the server when the link is initially accessed. The server can then associate the unique identifier with the link. If subsequent access is attempted using a device that does not match the unique identifier of the initial access, the subsequent access can be prevented. Multiple devices can be authorized for access for a single email address.

The ability to encrypt digital information in the data set is not limited to message or attachments. A device such as a printer, scanner or other imaging device 38 can be in communication with the encryption server 26 so that when digital information is created, such as scanned from a scanner or digitally enabled copier, the digital information can be transmitted to the gateway server or encryption server. A link to the encrypted scanned digital information can be then provided to a recipient. In one embodiment, a licensed user account can be associated with device 38 so that the attributes and properties of the encrypted digital information can be managed manually or can be set to operate automatically.

The computer readable instructions of the gateway server or encryption server can include instructions that can analyze the message or other digital information and determine if the content includes sensitive information where encryption is desired. In this case, the gateway server can then automatically send the information to the encryption server so that the message is encrypted, and a link provided to the recipient without the sender needing to determine if the message should be "bracketed". A list of trigger information can be used to determine if the information should be encrypted. For example, if an email message is being send by the sender, the email message could include either financial information in the body or in an attached spreadsheet. The gateway server can detect this information and automatically send the message and the attachment to the encryption server. In one example, if device 38 is used to digitize sensitive information such as health information, tax returns or financial information, the gateway server can detect this and send the digital information to the encryption server.

The present invention does not require specific client-side computer readable instructions for the sender to encrypt the message. The sender can use any client or platform (e.g. iPhone, Android, Windows, Linux, or PC) to initiate a link to the secured information and provide the link to the recipient. From this point, the sender and the recipient can conduct two-way communications without content of the message passing through the respective clients. Communications is provided through to the encryption server so that secured encrypted digital information is provided without modifications to the sender's server and without encryption technology being needed at the clients. In the case of the licensed sender, the sender's client does not need to be used at all in one embodiment.

To provide a secure enjoinment without having to modify clients or servers and allow encryption functionality to be used with existing email platforms, the encrypted information is stored on the encryption server. In some cases, it may be advantageous to remove the encrypted information, decrypt the information and place the decrypted information on a server as if originally created without the present invention. This can be accomplished by exporting the encrypted information to such server so that it can be accessible by a client. In this case, the sender or receiver, or other user, can initiate transfer of the a data set resulting in a decryption of the information and secure transmission of the decrypted information to the server thereby placing the decrypted data set in the proper inbox at 40.

Figure 2:
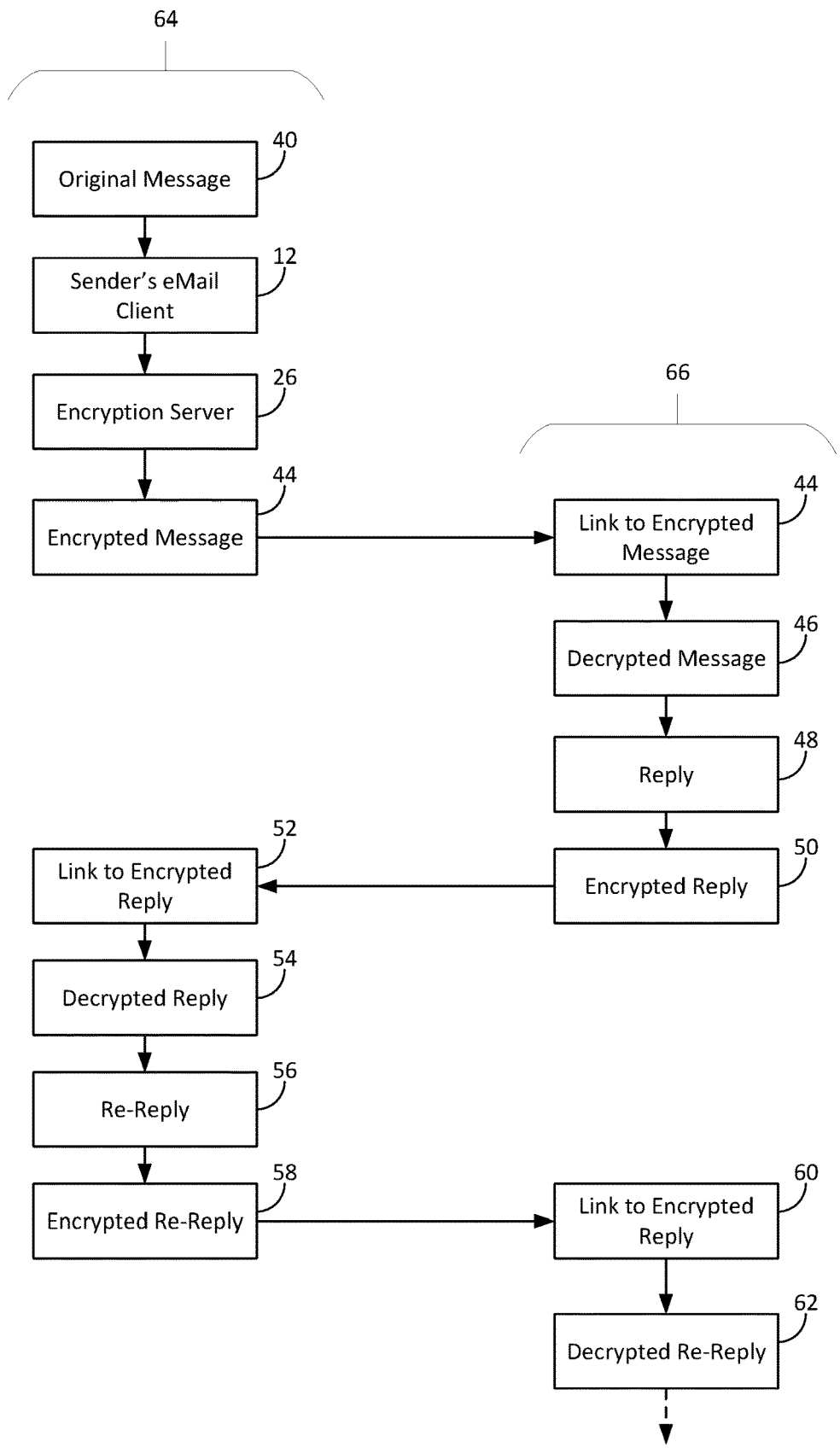
FIG. 2 is a diagram of aspects of the invention.

Referring to FIG. 2, The sender can create a data set, which can be email, text, images, attachments, or other digital information. The data set 40 can be created at the sender's client 12 or by directly accessing an encryption server 26. The data set is encrypted producing an encrypted data set 44 and stored on the encryption server or other location known to the encryption server. A link 46 to the encrypted server is generated and provided to the recipient through normal communications protocols and systems such as email clients and messages. The recipient, by accessing the link to the encryption server or other location known to the encryption server, causes the data set or information to be decrypted allowing the recipient to view the data set at 46. The recipient creates a reply 48 that can be encrypted by 50. The sender can be notified that a reply was generated and a link to the encrypted reply 52 can be provided back to the sender. The sender can decrypt the reply so that the decrypted reply 54 is provided to the sender. The sender can create a re-reply 56 to the recipient which can be encrypted into an encrypted re-reply at 58. A link to the encrypted re-reply can be created and provided to the recipient at 60. The re-reply can be decrypted and provided to the sender at 62. In this process, there is the sender thread 64 and the recipient's thread 66. The messages between the sender and recipient can continue extending the threads.

Typical to electronic message communications there is a sender and one or more recipients. There is a sender's thread and each of the recipient's thread. The computer readable instructions of the encryption server can use distinct encryption processes to encrypt each thread separately. Therefore each sender's and recipient's thread is encrypted with their own keys independent of each other so that the creator of the thread can control all copies of the threads and can perform tasks such as changing access and event delete specific threads.

Generally, the computer readable instructions can use asymmetrical encryption which uses two keys to access information: a public key for encryption, and a matching private key for decryption. The computer readable instructions can use symmetrical encryption which uses the same key to encrypt and decrypt information. In symmetrical encryption, it is desirable to keep both keys private. Symmetric encryption requires less computational power than asymmetric encryption and therefore is more efficient with computer resources and has better performance, than asymmetric encryption.

Figure 3:
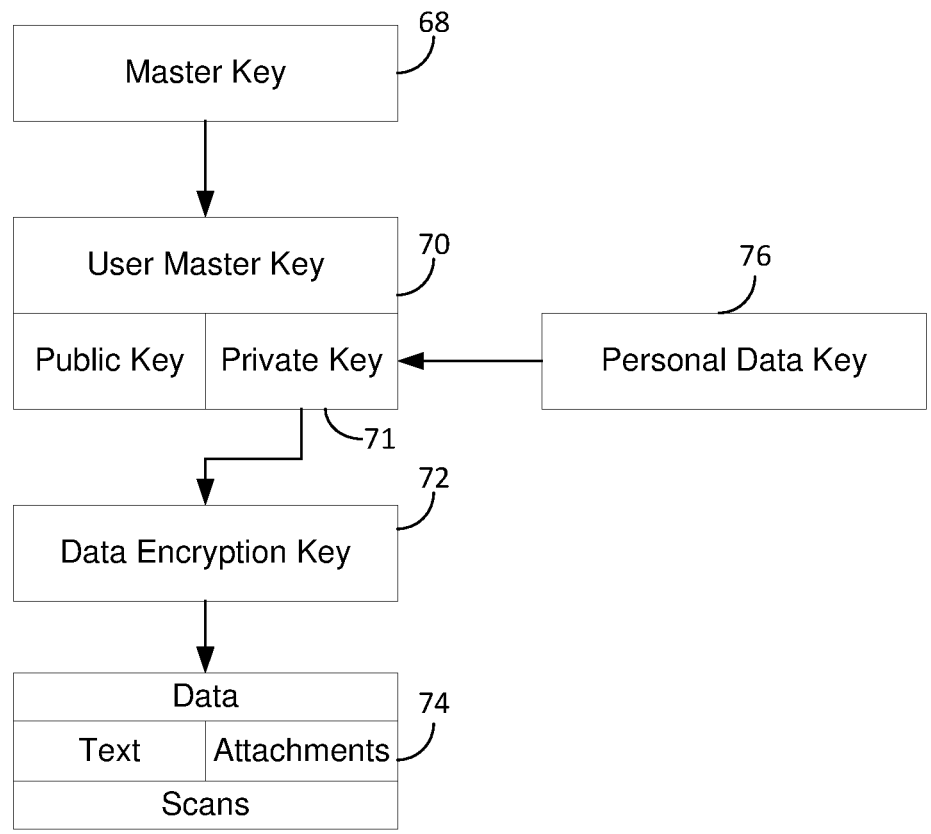
FIG. 3 is a diagram of aspects of the invention.

Referring to FIG. 3, the computer readable instructions of the present invention uses a composite encryption scheme incorporating both asymmetrical and symmetrical encryption. Master key 68 can be a private key with restricted access. This key can be stored at an access controlled redundant facility with heightened physical and digital security. This key is known to only a few select individuals so that access to this master key is very limited. The master key is used to encrypt the private key 71 of the asymmetric user master key 70. The private key of the user master key can be used to encrypt a symmetrical data encryption key 72. The data encryption key is used to encrypt the data that can include message content and text, attachments, scanned information, spread sheets, and the like. Each item or type of data can be encrypted using a distinct data encryption key. Further the data can be separated into segments so that each segment can be encrypted with a separate data encryption key.

In one embodiment, the user can provide a personal data key 76 which is an alphanumeric string, that can be used with the private key and the user master key so that even with the private key, someone would need the personal data key to decrypt information. This adds an additional layer of protection to the encrypted information because the sender does not need to rely solely upon automatically generated keys used by the encryption server. The composite encryption scheme can include receiving the PDK from the user, placing the PDK in temporary memory such as RAM, encrypt the private key of the UMK and remove the PDK from memory so that the only record of the PDK would be what the user records. Therefore, even were the encryption server breached, the PDK would not be discoverable.

Figure 4:
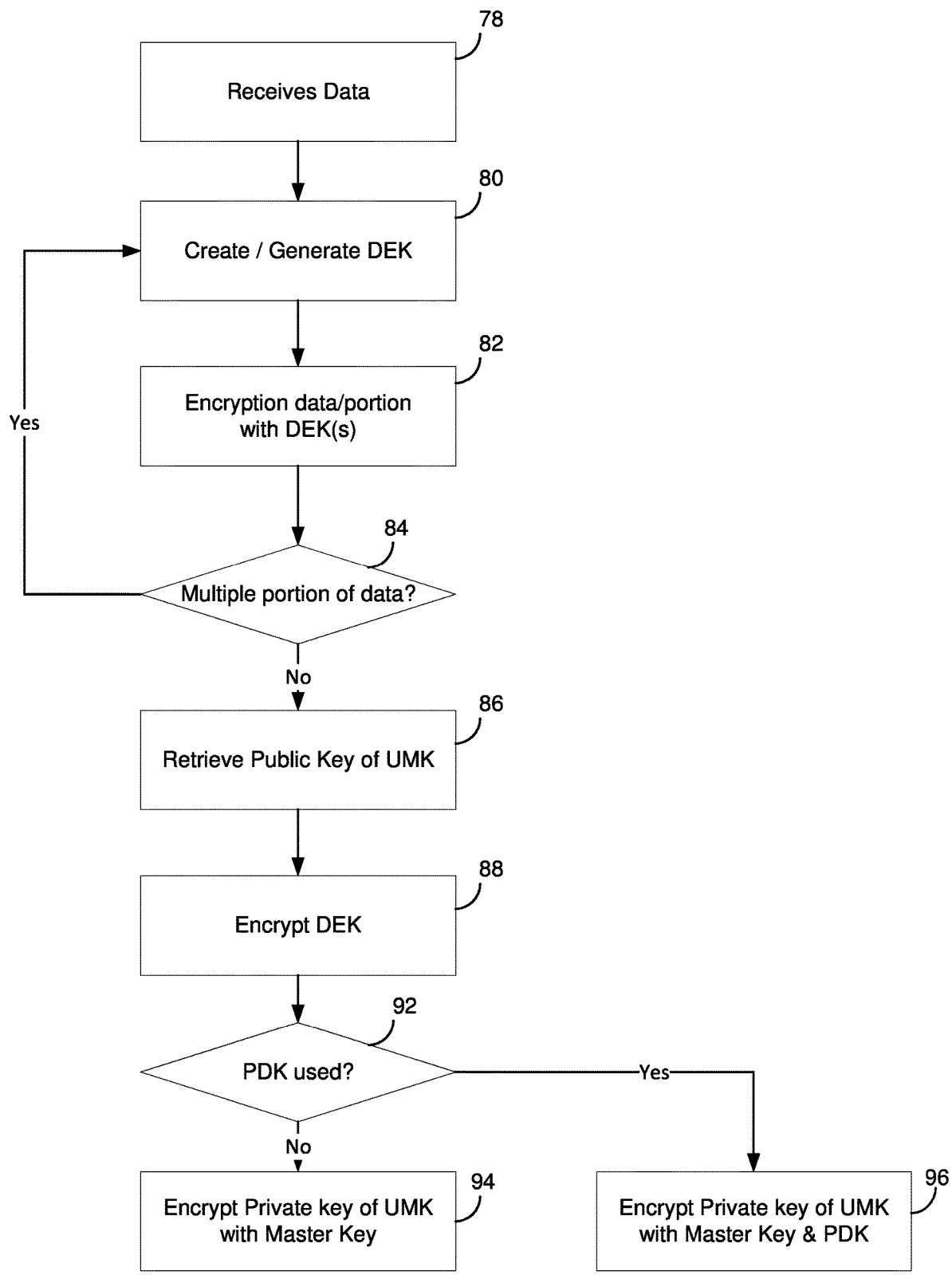
FIG. 4 is a diagram of aspects of the invention.

Referring to FIG. 4 the operation of the composite encryption scheme of the present invention is shown. The encryption server can receive data at 78 that is to be encrypted. A data encryption key (DEK) is created, generated or retrieved at 80 and the data is encrypted with the DEK at 82. A determination of whether additional elements or portion of the data needs to be encrypted at 84. If so, additional DEKs are created or retrieved and the respective element or portion is encrypted using additional DEK(s). For example, the data may include a text message, scanned document and spreadsheet attachment. The text message can be encrypted with a first DEK, the scanned document with a second DEK and the spreadsheet encrypted with a third DEK and so on. The data, including the text message, can also be portioned so that a first portion can be encrypted with a first DEK and the second portion encrypted with a second DEK. Encryption of the DEK can be represented as:

$$\sum_{i=1}^{n} E_i(DEK_i) \xrightarrow{yields} Enc_i$$

where n represents the number of data elements to be encrypted, $DEK_i$ means the DEK for the $i^{th}$ element, $E_i(\ )$ means the encryption process for the corresponding data element and $Enc_i$ is the resulting encrypted data element. For example, in a message with text content and an attachment, the encrypted text could be represented as $Enc_1$ encrypted with $DEK_1$ and $Enc_2$ can represent the encrypted attachment that was encrypted with $DEK_2$.

Once the data is encrypted using the DEK, the next layer is to protect the DEK from unauthorized discovery. The computer readable instructions can then encrypt the DEKs with asymmetrical encryption. The public key of the user master key (UMK) pair can be used to encrypt the DEK(s). The public key of the UMK can be retrieved for that user at 86 used to encrypt the DEK at 88. Therefore, the DEK can only be decrypted with the private key of the UMK used to encrypt the DEK. A determination can be made at 92 as to whether there is a personal data key (PDK). If there is no PDK, then the data is encrypted at 94. Otherwise, the data is encrypted using the PDK and DEK at 96.

With this composite encryption scheme, the message can have layered encryption with the UMK or the PDK know. Use of the PDK prevents the operators of the encryption server from being able to decrypt a user's message. Use of the MK prevents technical support from decrypting data without knowledge of the MK.

Using the composite encryption scheme, it is also possible to rotate the public and private keys of the UMK periodically without the need to decrypt the underlying data thereby keeping the underlying data secure. If the keys are to be rotated at the request of the sender, periodically, or by the encryption server operator, the DEK are decrypted and encrypted with the new UMK. Therefore, an efficient method of making prior UMK obsolete is provided that does not require revealing the underlying data. Encryption, in one embodiment, can be performed using a distributed, composite multi-layer encryption scheme with automatic key rotation.

In one embodiment, the default time where the data set expires can be one year. This time period can be adjusted for shorter or longer periods. The data set can be set to be deleted, accessed or recalled can be removed after a certain period of time.

The operation and advantages of the present invention over the prior art includes ease of use, no requirement for the installation of software, apps or plug-ins, password-free sign in, no recipient account requirement other than an email account, can be used with most if not all email clients, personalized notifications, large attachment sending capability, mobile and desktop devices can be used, can include SMTP TLS import/export gateway, can include composite/multi-layer AES256 encryption, can include, two factor authentication, can include distributed encryption keys so that keys and data are not stored together, geolocation sign-in requests can be provided, message expiration can be set to delete or remove messages at a certain period of time, recall expiration can be set preventing subsequent message recall, and notification-level subject masking can be included In one embodiment, the client can be configured to be associated with the server using such designations as pop.server.email, imap.server.mail or smtp.server.email and the like. The server can intercept the sender's email, encrypt the email and send the link to the recipient. The computer readable instructions on the server can detect that the email of digital information is to be encrypted and retrieve key(s) to be used for that email, encrypt the email and store the encrypted email on the server. If the server does not detect brackets in the subject line or other indicators representing an encryption request, the server can simply pass along the email to the recipient traditionally. If the email is encrypted, the link to the server associated with the encrypted email is created and transmitted to the recipient as an email message that can appear in the recipient inbox. The recipient clicks the link and enters the recipient's email address. The server detects the email address and determines if the intended recipient of the encrypted email matches the email address of the recipient and if so, provide the content of the email, decrypted, to the recipient.

This invention is not limited to the transmission of email or other data. This invention can be used for the creation, storage, and/or transmission of any digital information including email. The invention can also encrypt not just the email, but any attachment(s) as well. The attachment(s) can also be deleted or have access removed after a certain predetermined period of time.

Figure 5:
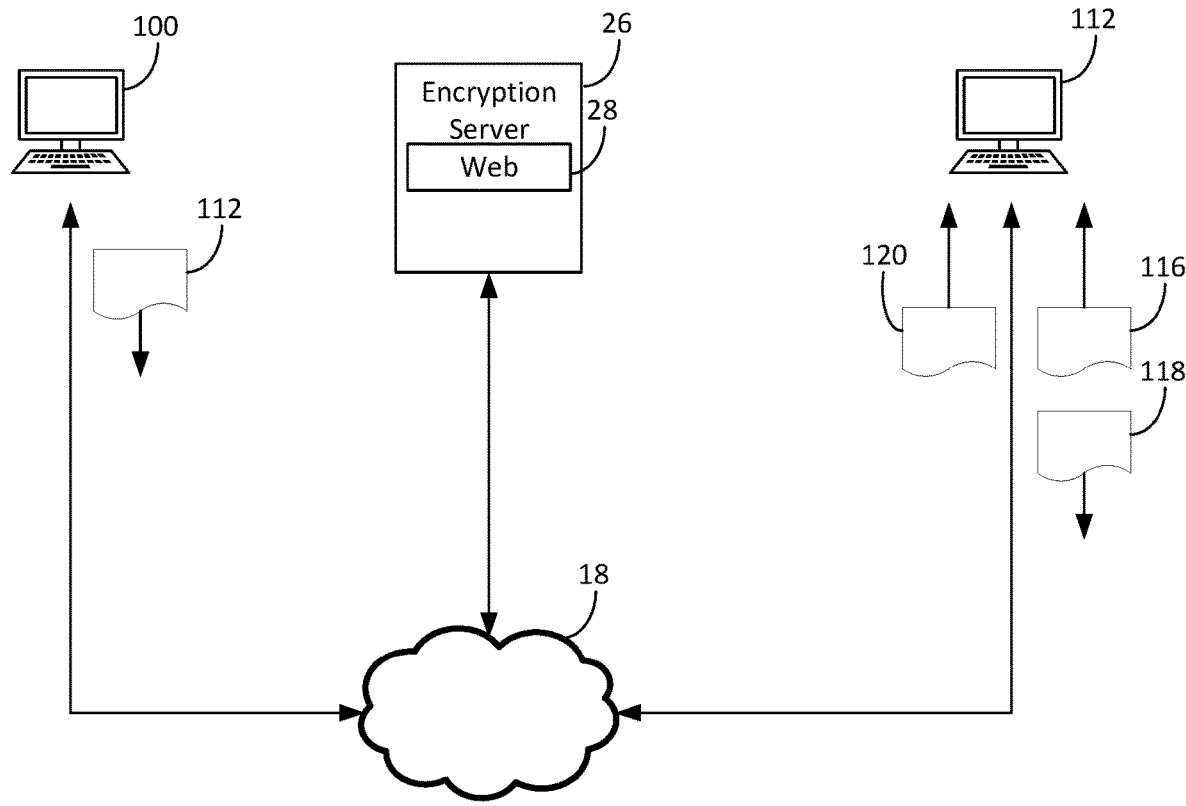
FIG. 5 is a diagram of aspects of the invention.

Referring to FIG. 5, a subscriber computer system 100 can be in communications with wide area network 18 (e.g. Internet) allowing the licensed user or subscriber computer system to be in electronic communications with an encryption server 26. The encryption server can also verify if the sender or recipient is a licensed or valid subscriber. The subscriber computer system can be used to access the web portion 28 of the encryption server an create a unique subscriber hyperlink associated with the subscriber. This unique subscriber hyperlink can be publicly published allowing anyone to access this hyperlink.

A sender can use a sender computer system 112 to access the unique subscriber hyperlink 114, thereby accessing the encryption server. The web portion can provide to the sender computer system a form 116 requesting content, attachments, and the sender's address (e.g. email address, message content 118 and identification information). The content and attachment(s) can be sent to and stored encrypted with a private key on the encryption server. The system can verify that the sender's email is associated with the sender by emailing a verification code 120 to the provided email and requesting that this verification code be provided onto the system. If the email is verified, the message and attachments are sent to the subscriber. The message is transmitted to the subscriber by sending the subscriber a link to the message as described herein. If the email is not verified after a predetermined period of time or too many failed attempts to verify the email occur, the message and attachments are deleted, and the process concludes. When the sender sends content of attachment to the subscriber using the unique subscriber hyperlink, the encryption server can send the content and attachment to the subscriber using an email server 20 FIG. 1) and email client 22 (FIG. 1). Further, since the unique subscriber hyperlink is secured from the sender's computer device to the encryption server and the message and attachments are encrypted at rest and travel, this system effectively provinces for point to point encryption without the need for client side encryption software.

Figure 6:
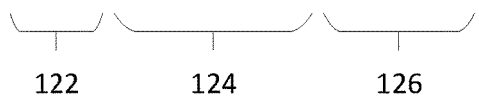
FIG. 6 is a diagram of aspects of the invention.

Referring to FIG. 6, in one embodiment, the unique subscriber hyperlink can be a URL link having the https designation 122 (e.g. scheme under RFC 1738), a path component 124 and a unique component 126 (e.g. fragment). The path component can be the web address of the web portion of the encryption server or indicate a different host. The unique component can be an alpha numeric identifier associated with the scriber or the subscriber computer system. In one embodiment the URL is limited to ACSII characters.

Figure 7:
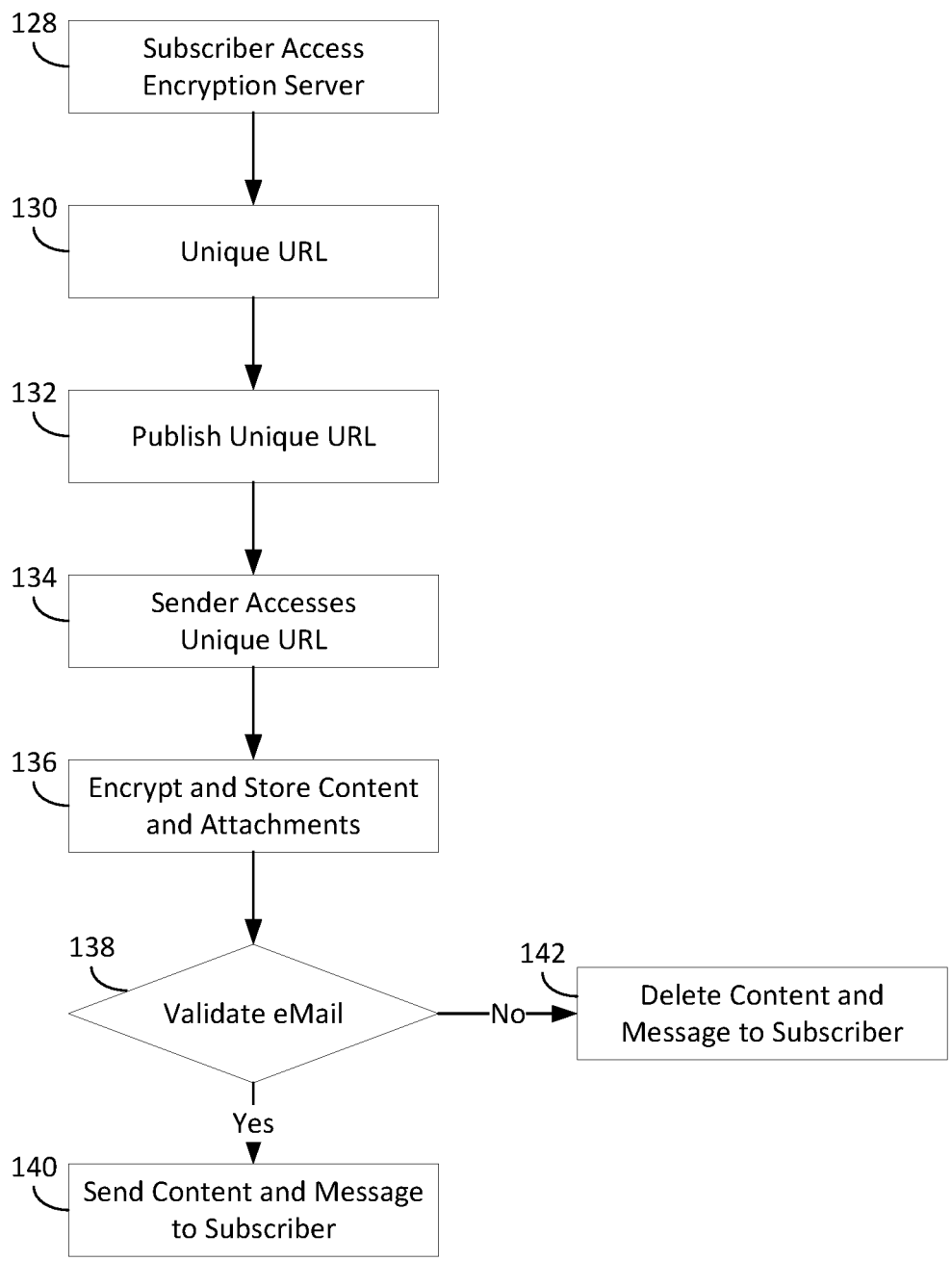
FIG. 7 is a diagram of aspects of the invention, and,
FIG. 8 is a diagram of aspects of the invention.

Referring to FIG. 7, the computer readable instructions, computerized method and method of provide secured communications can begin with a subscriber accessing the encryption server at 128 and creates an account. A unique subscriber hyperlink can be created at 130 uniquely associated with the subscriber of a subscriber computer system. The unique subscriber hyperlink does not have to be associated with a unique sender but can be associated with multiple senders that same a common email. The unique system can require that the relationship between the unique subscriber hyperlink and an email address be a one to one relationship. The unique subscriber hyperlink can be published at 132.

A sender can use the unique subscriber hyperlink and access the encryption server at 134 and can uses an underlying form to provide the sender's content, attachments, and email. The content and attachments can be encrypted on the encryption server using a key at 136. The email provided by the sender can be validated at 138. Validation can be accomplished through sending a one-time code to the sender's email and requiring that the code be entered by the sender to verify that the sender is associated with the sender's email. The sender's email can be validated using other methods as well. If the email is validated the content and message can be sent to the subscriber at 140. In one embodiment, the content and message can be sent to the subscriber using the computer readable instructions that provide for the steps shown at 44 (FIG. 2), step 68 (FIG. 3), step 78 (FIG. 4), their respective subsequent steps or any combination thereof. If the email is not validated, the content and attachments can be permanently deleted from the encryption server at 142. The email may be invalid for several reason including, improper email format, unauthorized host location, failure of the sender to response to a validation request, too many unsuccessful attempts, after a predetermined period of time or any combination thereof.

Figure 8:
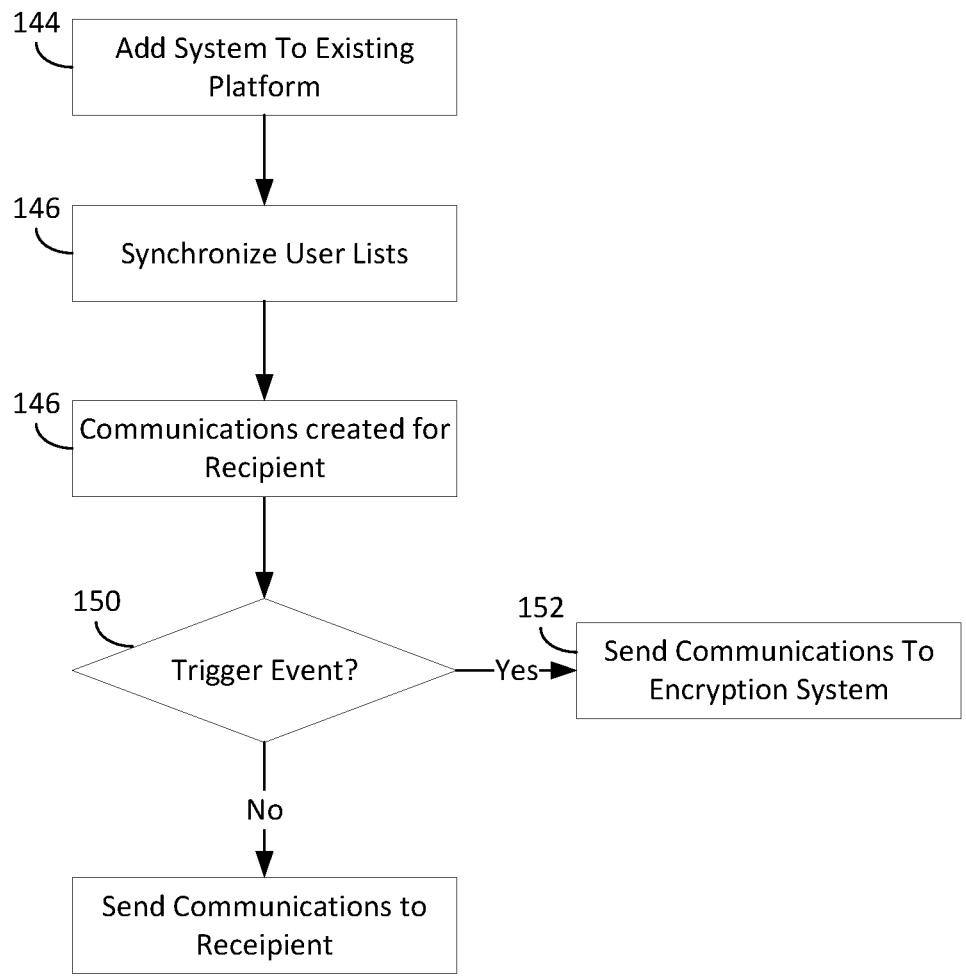

Referring to FIG. 8, the system described herein can be integrated with existing email and/or office productivity platforms, including cloud-based platforms, and deployed in addition to or from these existing communications systems (e.g. Office 365, G Suite, WordPerfect Office, Yahoo! Mail, Amazon WorkMail and the like). In one embodiment, an email platform administrator can select the system described herein to provide encryption functionality with the existing email or office productivity platform at 144. The platform can include integration functionality, such as an application programming interface (API), that allows the platform to communicate with the present system. The administrator can provide any necessary credentials to define the data to be shared between the platform and the present system. The API can then be called and based upon the credentials, the data from the platform can be shared with the present system.

Once called, the platform can synchronize the list of users of the present system with the list of users of the platform at 146. The platform can then be configured so that when a communication is sent at 148, it can be routed to the present system for encryption according to a trigger event. This configuration can include encryption triggers at 150 that, once occur, cause the communications (e.g. email, text, content, attachments) to be encrypted at 152. A trigger event could include alphanumeric text included in the communications (e.g. brackets [ ] wrapped around the subject), the detection of sensitive data from the content of the message (e.g. social security number, "$"), or if content or other portion of the message matches predetermined criteria such as from a specific sender or sender host, to a specific recipient or recipient host, content, and the like. The predetermined content can be included in a dictionary so that if the content matches the communication (or portion thereof) a trigger event occurs.

For example, and in one embodiment, the user will send an email using the platform. This action causes an encryption trigger to occur and the platform then routes the email to the encryption system. This routing can be performed with SMTP with TLS encryption to the encryption server. The encryption server then receives the email, encrypts the email and delivers the encrypted email to the recipients. The encryption server can be physically separate hardware with computer readable instructions, computer readable instructions on a virtual server, computer readable instructions on the platform, or any combination thereof.

The communications from the platform is not limited to email applications but can include documents generated from office productivity applications that can be shared among users. For example, sharing document under Office 365 can be performed from Word or Outlook, including the sharing of documents on One Drive. The present application provides for encrypted communications of document sharing between the various users.

If the content and attachments are successfully sent to the subscriber, a link to the message can be provided to the subscriber informing the subscriber that an encrypted communication is ready for viewing. The link can allow the subscriber to access the encryption server and view the encrypted communication.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention, as described by the appended claims. Likewise, other objects, features, benefits and advantages of the present invention will be apparent from this summary and certain embodiments described below, and will be readily apparent to those skilled in the art Such objects, features, benefits and advantages will be apparent from the above in conjunction with the accompanying examples, data, figures and all reasonable inferences to be drawn therefrom, alone or with consideration of the references incorporated herein.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. A computerized system for encryption and transmission of digital information comprising:
   a gateway server in communications with a sender's content server and recipient's server having a gateway computer readable medium;
   a set of non-transitory computer readable instructions stored on the gateway computer readable medium configured for:
   intercepting a data set from a sender's content server wherein the data set is associated with a sender's email,
   sending a one-time code to a sender,
   receiving the one-time code representing a validation that the sender is associated with the sender's email and upon receiving the validation,
   receiving a personal key from the sender,
   encrypting a portion of the data set with the personal key,
   generating a key pair having a first key and a second key,
   encrypting the personal key with the first key,
   encrypting the second key with a master key,
   generating a notification link represented that a message is awaiting a recipient and,
   sending the notification link to the recipient's server adapted for viewing by the recipient wherein the notification link includes security properties consisting of an expiration time for the notification link, recipient device dependent information and biometric information.

2. The computerized system of claim 1 wherein the notification link includes security properties taken from the group consisting of an expiration time for the data set, and geolocation dependent information, or any combination thereof.

3. The computerized system of claim 1 wherein the first key is a public key.

4. The computerized system of claim 1 wherein the second key is a private key.

5. The computerized system of claim 1 wherein the set of non-transitory computer readable instructions are configured for receiving a reply from a recipient computer device in communications with the recipient's server, generating a recipient key, encrypting the reply with the recipient key, encrypting the recipient key with the first key, and creating a reply hyperlink to the reply that has been encrypted.

6. The computerized system of claim 5 wherein the set of non-transitory computer readable instructions are configured for transmitting the reply hyperlink to the sender's content server.

7. The computerized system of claim 1 including a set of non-transitory gateway instructions configured for receiving the data set and encrypting a portion of the data set with the personal key according to a trigger information.

8. The computerized system of claim 7 wherein the trigger information includes a bracket placed in a subject line of the data set.

9. The computerized system of claim 7 wherein the trigger information includes predetermined content in a subject line of the data set.

10. The computerized system of claim 7 wherein the trigger information includes predetermined content in the data set.

11. The computerized system of claim 1 including a recipient computer device that includes an email client in communications with an email server for receiving the notification link.

12. The computerized system of claim 1 including a recipient computer device includes including a text message client configured to receive the notification link.

13. The computerized system of claim 1 wherein the set of non-transitory computer readable instructions include instructions for periodically generating a key pair having a public key and a private key, encrypting the personal key with the public key, and encrypting the private key with a master key.

14. The computerized system of claim 1 wherein the personal key is a first personal key, and the set of non-transitory computer readable instructions include instructions for encrypting a second portion of the data set with a second personal key.

15. The computerized system of claim 1 wherein a first portion of the data set is a text of a message, and a second portion of the data set is an attachment associated with the text.

16. The computer system of claim 15 wherein the text is an email message.

17. A computerized system for encryption and transmission of digital information comprising:
a set of non-transitory computer readable instructions that, when executed by a processor, preform the steps of:
receiving a data set from an instance of a sender browser running on a sender computer device, sending a one-time code to a sender's server, receiving the one-time code from the sender's server representing a validation that a sender is associated with a sender's email and upon receiving the validation, generating a sender key, creating an encrypted data set including at least a portion of the data set with the sender key according to a trigger included in the data set, storing the encrypted data set on a gateway server, generating a key pair having a first key and a second key, encrypting the sender key with the first key, and, generating a hyperlink to portion of the encrypted data set wherein the hyperlink includes security properties consisting of an expiration time for the hyperlink, recipient device dependent information and biometric information.

18. The computer system of claim 17 wherein generating a hyperlink includes generating a hyperlink that may only be accessed from a predetermined geographic location.

19. The computer system of claim 17 wherein generating a hyperlink includes generating a hyperlink that may only be accessed from a predetermined computer device.

20. A computerized system for encryption and transmission of digital information comprising:
a set of non-transitory computer readable instructions that, when executed by a processor, preform the steps of:
receiving a data set, sending a one-time code to a sender client, receiving the one-time code from the sender client representing a validation that a sender is associated with a sender's email and upon receiving the validation, creating an encrypted data set that includes at least a portion of the data set with a sender key, storing the encrypted data set on a gateway server;
generating a key pair having a first key and a second key, encrypting the sender key with the first key, and,
generating a hyperlink to portion of the data set that is encrypted wherein the hyperlink includes security properties consisting of an expiration time for the hyperlink, recipient device dependent information and biometric information.

21. The computer system of claim 20 wherein the set of non-transitory computer readable instructions are in communication with an existing communications system through an application program interface wherein the receiving a data set includes intercepting the data set from the existing communications system.

22. The computer system of claim 20 wherein the set of non-transitory computer readable instructions are configured for deleting the encrypted data set after a predetermined period of time.

23. The computer system of claim 20 wherein the set of non-transitory computer readable instructions are configured for deleting the encrypted data set after a predetermined number of failed access attempts by a recipient.

24. The computer system of claim 20 wherein the set of non-transitory computer readable instructions are configured for deleting the encrypted data set according to a delete request from the sender.

* * * * *